(12) United States Patent
Miyamoto et al.

(10) Patent No.: US 8,337,186 B2
(45) Date of Patent: Dec. 25, 2012

(54) METHOD AND APPARATUS FOR MOLDING RESIN FOAM PRODUCT

(75) Inventors: Tuguhisa Miyamoto, Higashi-Hiroshima (JP); Junichi Ogawa, Hiroshima (JP); Mitsuharu Kaneko, Hiroshima (JP); Yukinori Nakajima, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 266 days.

(21) Appl. No.: 12/647,947

(22) Filed: Dec. 28, 2009

(65) Prior Publication Data

US 2010/0181692 A1 Jul. 22, 2010

(30) Foreign Application Priority Data

Jan. 19, 2009 (JP) ................................ 2009-008696

(51) Int. Cl.
*B29C 44/42* (2006.01)
*B29C 45/77* (2006.01)
(52) U.S. Cl. .................... 425/4 R; 264/328.12; 264/51; 425/145; 425/573
(58) Field of Classification Search .............. 264/51, 264/513, 521, 519, 500, 328.12–328.13; 425/4 R, DIG. 244–DIG. 246, 145, 573
See application file for complete search history.

(56) References Cited

U.S. PATENT DOCUMENTS

| | | | | |
|---|---|---|---|---|
| 3,719,441 A * | 3/1973 | Spaak et al. | .................... | 425/4 R |
| 3,966,372 A * | 6/1976 | Yasuike et al. | ................. | 425/4 R |
| 4,042,660 A * | 8/1977 | Bishop | ............................. | 264/77 |
| 4,164,523 A * | 8/1979 | Hanning | .......................... | 264/28 |
| 4,201,742 A * | 5/1980 | Hendry | .......................... | 264/45.5 |
| 4,507,255 A * | 3/1985 | Shizawa | .......................... | 264/45.1 |
| 4,676,938 A * | 6/1987 | Karklin et al. | ............... | 264/46.5 |
| 4,740,150 A * | 4/1988 | Sayer | ............................. | 425/542 |
| 5,246,646 A * | 9/1993 | Baxi | ............................ | 264/40.3 |
| 5,707,659 A * | 1/1998 | Erikson | .......................... | 425/130 |
| 5,716,560 A * | 2/1998 | Heuchert et al. | ........... | 264/37.17 |
| 5,902,541 A * | 5/1999 | Imai et al. | ..................... | 264/572 |
| 5,928,677 A * | 7/1999 | Gosdin | .......................... | 425/130 |
| 5,965,076 A * | 10/1999 | Banks et al. | .................. | 264/219 |
| 6,074,190 A * | 6/2000 | Nagaoka et al. | .............. | 425/130 |
| 6,294,126 B1 * | 9/2001 | Eckardt et al. | ................ | 264/500 |

(Continued)

FOREIGN PATENT DOCUMENTS

JP S61-244514 A 10/1986

(Continued)

OTHER PUBLICATIONS

Japanese Office Action "Notice of Reasons for Rejection" with mailing date of Dec. 21, 2010; Japanese Application No. 2009-008696 with translation.
Translation of JP2004-017285; Oct. 1, 2009.

*Primary Examiner* — Joseph Del Sole
*Assistant Examiner* — Nahida Sultana
(74) *Attorney, Agent, or Firm* — Studebaker & Brackett PC; Donald R. Studebaker (57) ABSTRACT

An example molding method includes: feeding a molten foamable resin by injection in a cavity formed in a molding die; allowing the molten foamable resin to flow in the cavity; and foaming and solidifying the molten foamable resin to mold a resin foam product. The example molding method performs flow rate control by controlling a flow rate of the molten foamable resin at a welding portion to be equal to or higher than a flow rate of the molten foamable resin at an upstream portion adjacent to the welding portion.

8 Claims, 6 Drawing Sheets

U.S. PATENT DOCUMENTS

| | | | |
|---|---|---|---|
| 6,558,592 B1 * | 5/2003 | Nohara et al. | 264/51 |
| 6,630,085 B1 * | 10/2003 | Bielich et al. | 264/40.1 |
| 6,971,869 B2 * | 12/2005 | Olaru | 425/549 |
| 7,713,464 B2 * | 5/2010 | Nakajima et al. | 264/513 |
| 7,846,364 B2 * | 12/2010 | Arai et al. | 264/242 |
| 7,878,785 B2 * | 2/2011 | Cathcart et al. | 425/4 R |
| 2008/0150701 A1 * | 6/2008 | Randmae | 340/10.5 |

FOREIGN PATENT DOCUMENTS

| | | |
|---|---|---|
| JP | H02-147217 A | 6/1990 |
| JP | H10-052850 A | 2/1998 |
| JP | 2004-017285 A | 1/2004 |
| JP | 2007-253443 A | 10/2007 |
| WO | 2007/015390 A1 | 2/2007 |

* cited by examiner

METHOD AND APPARATUS FOR MOLDING RESIN FOAM PRODUCT

CROSS-REFERENCE TO RELATED APPLICATION

This application claims priority to Japanese Patent Application No. 2009-8696 filed on Jan. 19, 2009, the disclosure of which including the specification, the drawings, and the claims is hereby incorporated by reference in its entirety.

BACKGROUND

The present disclosure relates to molded resin products, and more particularly to a method for molding resin foam products, and a molding apparatus used in the molding method.

For example, Japanese Patent Publication No. 2004-17285 discloses an example of a method for molding a resin foam product by combining a short shot process and a core back process. In the short shot process, a molten foamable resin containing a foaming agent is fed in a cavity formed in a molding die in an amount smaller than the volume of the cavity. The core-back process is performed by moving the molding die in a die opening direction in the course of the molding.

SUMMARY

A method for molding a resin foam product disclosed in this specification includes: feeding a molten foamable resin by injection in a cavity formed by cavity surfaces of a molding die; allowing the molten foamable resin fed in the cavity to flow in the cavity so as to substantially fill the cavity; and foaming and solidifying the molten foamable resin substantially filling the cavity to mold the resin foam product. The molding die has a welding portion corresponding to a weld generated in the resin foam product where a plurality of flows of the molten foamable resin meet and weld to each other, and an upstream portion adjacent to the welding portion and upstream of the welding portion in a flow direction of the molten foamable resin, and flow rate control is performed in such a manner that a flow rate of the molten foamable resin at the welding portion is equal to or higher than a flow rate of the molten foamable resin at the upstream portion.

DETAILED DESCRIPTION

In molding a resin foam product, for example, a molten resin may be fed in the cavity by injection through a plurality of gates. Flows of the molten resin fed through the plurality of gates move within the cavity, respectively, and then meet in the cavity. The flows met and welded to each other generate a weld in a molded resin product. For example, when a pin is arranged in the cavity to form a hollow portion in the molded resin product, a flow of the molten resin is divided to go around the pin, and then the divided flows meet each other. Therefore, a weld is generated in the molded resin product. Further, in molding a resin product of a complicated shape, a plurality of flows of the molten resin meet in the cavity, thereby generating the weld in the molded resin product.

In view of the above, the inventors of the present application have found that a diameter of foam cells at the weld becomes larger than a diameter of foam cells at the other portions of the resin foam product made from a molten foamable resin. The increase in foam cell size results in local reduction in strength of the resin foam product.

As a result of studies on the increase in foam cell size, the inventors have found that one of the causes of the increase in foam cell size at the weld is that a leading edge of the flow of the molten foamable resin moving in the cavity is relatively low in pressure, and a foaming agent contained in the molten foamable resin easily foams in the leading edge of the flow. Specifically, while the molten foamable resin fed in the cavity is flowing in the cavity, the foaming agent has already started foaming in the leading edge of the flow. Therefore, gas generated as the foaming agent foams is gathered around a welding portion where the leading edges of the flows meet. Then, the ratio of the gas to the resin relatively increases around the welding portion, thereby increasing the foam cell size at the weld. According to the studies, the inventors have made a new finding that the foam cell size remarkably increases because the pressure in the cavity relatively decreases, for example, when a short shot of the molten foamable resin is fed in the cavity, or the molten foamable resin is foamed by the core back process.

The inventors of the present application have made further studies on a flow rate of the molten foamable resin in the cavity to suppress the increase in foam cell size. As a result, they have found that increasing the flow rate of the molten foamable resin around the welding portion is effective in suppressing the increase in foam cell size. Specifically, an increased flow rate allows the leading edges of the flows to meet each other in an early stage, thereby reducing a period of time where the foaming agent can foam before the flows meet, and raises the pressure in the cavity around the welding portion, thereby suppressing the foaming of the foaming agent.

An example method for molding a resin foam product includes: feeding a molten foamable resin by injection in a cavity formed by cavity surfaces of a molding die; allowing the molten foamable resin fed in the cavity to flow in the cavity so as to substantially fill the cavity; and foaming and solidifying the molten foamable resin substantially filling the cavity to mold the resin foam product.

The molding die has a welding portion corresponding to a weld generated in the resin foam product where a plurality of flows of the molten foamable resin meet and weld to each other, and an upstream portion adjacent to the welding portion and upstream of the welding portion in a flow direction of the molten foamable resin, and flow rate control is performed in such a manner that a flow rate of the molten foamable resin at the welding portion is equal to or higher than a flow rate of the molten foamable resin at the upstream portion.

When the molten foamable resin is fed in the cavity by injection, the flow rate of the molten foamable resin flowing in the cavity decreases as a distance traveled by the molten foamable resin from an injection gate increases due to viscosity of the molten foamable resin, solidification of the molten foamable resin cooled by the cavity surfaces, etc. Since a distance between the gate and the welding portion corresponding to the weld is relatively long, the flow rate of the molten foamable resin at the welding portion is relatively low. This leads to the increase in foam cell size at the weld as described above.

According to the disclosed method, however, the flow rate control makes it possible to maintain the flow rate of the molten foamable resin at the welding portion relatively high. This advantageously allows the leading edges of the flows of the molten foamable resin to meet each other in an early stage, thereby reducing a period of time where the foaming agent contained in the molten foamable resin can foam before the leading edges of the flows meet, and raises the pressure in the cavity around the welding portion, thereby suppressing the foaming of the foaming agent. As a result, the increase in foam cell size at the weld of the resin foam product can be suppressed. This is advantageous in avoiding local reduction in strength of the resin foam product.

The flow rate control may be performed by reducing a flow resistance of the molten foamable resin at the welding portion lower than a flow resistance of the molten foamable resin at the upstream portion.

Reducing the flow resistance can suppress the decrease in flow rate of the molten foamable resin, thereby maintaining the flow rate of the molten foamable resin at the welding portion relatively high.

The flow rate control may be performed by raising a temperature of the cavity surfaces corresponding to the welding portion higher than a temperature of the cavity surfaces corresponding to the upstream portion.

Raising the temperature of the cavity surfaces corresponding to the welding portion can prevent cooling of the flowing molten foamable resin by the cavity surfaces, and the resulting solidification of the molten foamable resin. Specifically, a flow resistance of the molten foamable resin (in particular, a flow resistance due to contact between the molten foamable resin and the cavity surfaces) can be reduced. Further, heat transmission from the high temperature cavity surfaces raises the temperature of the molten foamable resin, thereby decreasing the viscosity of the molten resin, and reducing the flow resistance of the molten foamable resin. This can suppress the decrease in flow rate of the molten foamable resin.

The flow rate control may be performed by making the cavity surfaces corresponding to the welding portion smoother than the cavity surfaces corresponding to the upstream portion.

Smoothening the cavity surfaces corresponding to the welding portion can reduce the flow resistance due to contact between the molten foamable resin and the cavity surfaces. This can suppress the decrease in flow rate of the molten foamable resin in the same manner as described above.

The flow rate control may be performed by reducing a cross-sectional area of a flow path of the molten foamable resin at least in a position closer to the welding portion than to the upstream portion.

Reducing the cross-sectional area of the flow path can accelerate the flow rate of the molten foamable resin passing through the narrowed flow path. This can make the flow rate of the molten foamable resin at the welding portion equal to or higher than the flow rate of the molten foamable resin at the upstream portion.

The molding may include moving the molding die in a die opening direction to increase a volume of the cavity, thereby foaming the molten foamable resin in the cavity. That is, a core back process may be performed.

The core back process allows easy adjustment and setting of a foaming ratio of the foaming agent. However, at the same time, the pressure in the cavity becomes relatively low in this process, and the increase in foam cell size is likely to occur as described above. According to the disclosed method, the increase in foam cell size at the weld can be suppressed as described above. Thus, the disclosed method is particularly advantageous for the molding method using the core back process.

The feeding may be performed by feeding the molten foamable resin into the cavity in an amount smaller than the volume of the cavity. That is, the molten foamable resin may be fed by a short shot process.

The short shot process also allows easy adjustment and setting of a foaming ratio of the foaming agent. However, at the same time, the increase in foam cell size is likely to occur. According to the disclosed method, the increase in foam cell size at the weld can be suppressed as described above. Thus, the disclosed method is particularly advantageous for the molding method in which a short shot of the molten foamable resin is injected.

An example apparatus for molding a resin foam product includes: a molding die having a cavity formed by cavity surfaces; and a feeder for feeding a molten foamable resin in the cavity by injection. The molten foamable resin fed in the cavity by the feeder flows in the cavity to substantially fill the cavity, and the molding die has a welding portion corresponding to a weld generated in the resin foam product where a plurality of flows of the molten foamable resin meet and weld to each other, and an upstream portion adjacent to the welding portion and upstream of the welding portion in a flow direction of the molten foamable resin.

The molding die is configured to control a flow rate of the molten foamable resin at the welding portion to be equal to or higher than a flow rate of the molten foamable resin at the upstream portion.

The molding die may be configured to reduce a flow resistance of the molten foamable resin at the welding portion lower than a flow resistance of the molten foamable resin at the upstream portion.

The molding die may include a heater for heating the cavity surfaces corresponding to the welding portion.

The cavity surfaces corresponding to the welding portion may be smoother than the cavity surfaces corresponding to the upstream portion.

The molding die may include a restriction where a cross-sectional area of a flow path of the molten foamable resin is reduced at least in a position closer to the welding portion than to the upstream portion.

The molding die may be configured to move the molding die in a die opening direction to increase a volume of the cavity, thereby foaming the molten foamable resin in the cavity.

Figure 1:
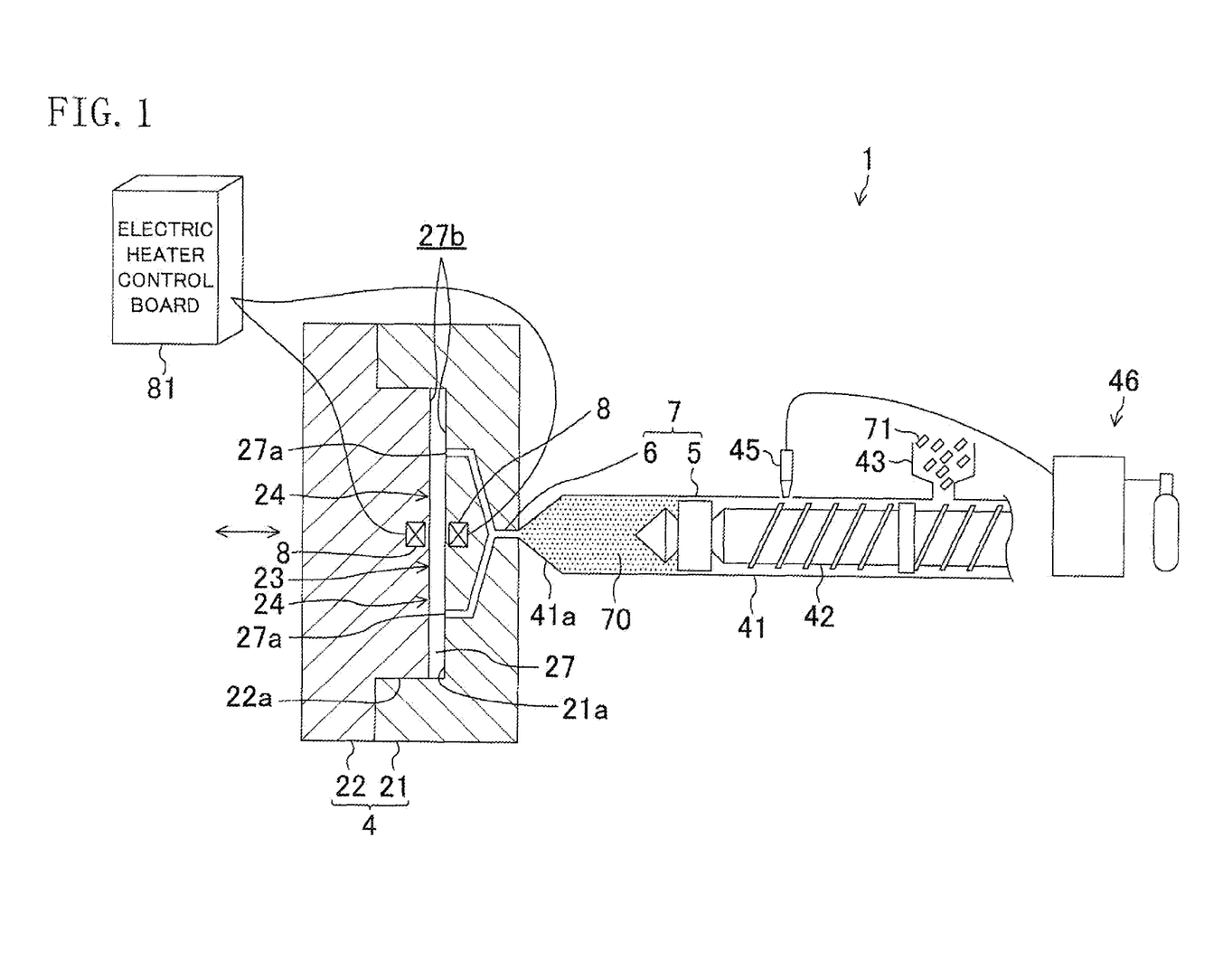
FIG. 1 is a schematic view illustrating an example molding apparatus.
Figure 2:
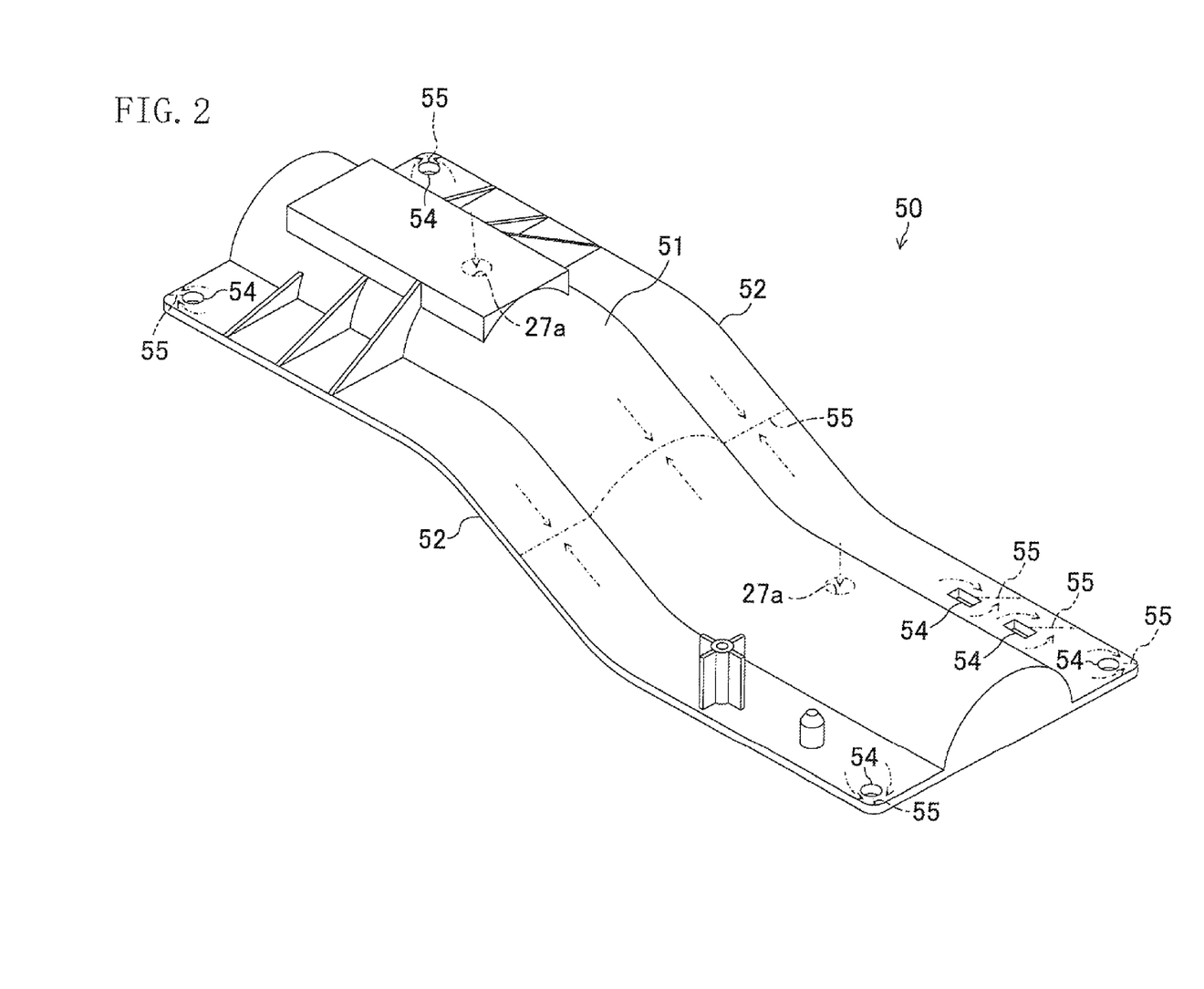
FIG. 2 is a perspective view illustrating an example of a resin foam product.

The example molding method and the example molding apparatus will be described hereinafter in more detail with reference to the drawings. FIG. 1 shows an example of a molding apparatus 1. The molding apparatus 1 molds a resin foam product by foaming and solidifying a molten foamable resin 70 fed in a cavity 27 of a molding die 4. The resin foam product is applicable in a wide range of fields, e.g., automobiles, building materials, home appliances, everyday sundries, etc. In such uses, the resin foam product can be used as reinforcements, heat insulators, sound insulators, vibration isolators, shock absorbers, etc. FIG. 2 shows a duct member 50 of an air conditioner for automobiles as an example of the resin foam product. The duct member 50 is a half-cut duct. A pair of duct members 50 are combined to form a cylindrical duct. Forming the air conditioner duct from the resin foam product is advantageous because the duct wall is constituted of a heat insulating layer of foam cells, thereby providing a high heat insulation characteristic.

The duct member (the resin foam product) 50 will be described in more detail. The resin foam product 50 has a hollow bulge portion 51 bulging in the shape of a semicircle at its center in a width direction (a direction from a left front side to a right rear side in FIG. 2) and extending lengthwise orthogonal to the width direction, and flat portions 52 projecting outward from both widthwise ends of the bulge portion 51, respectively, and extending along the bulge portion 51. The flat portions 52 have through holes 54 arranged to penetrate the flat portions 52 in the thickness direction at suitable positions for attachment and fixing of the resin foam product 50. In molding such relatively long and narrow resin foam product 50, the molten foamable resin 70 may be fed in the cavity 27 through a plurality of locations (gates) arranged at intervals in the longitudinal direction. Reference characters 27*a* in FIG. 2 virtually indicate examples of the gate location. When the molten foamable resin is injected into the cavity 27 through the plurality of gates 27*a* (two gates in this example), flows of the molten foamable resin entering the cavity 27 through the two gates 27*a* meet approximately halfway between the gates 27*a* (see arrows of a dash-dot line in FIG. 2). The resin flows met and welded to each other generate a weld 55 in the resin foam product 50. Further, the through holes 54 in the flat portions 52 are formed by arranging pins in a molding die 4. The flow of the molten foamable resin is divided to go around the pin, and then the divided flows meet each other (see arrows of a dash-dot line in FIG. 2). Therefore, welds 55 are also generated near the through holes 54. In the resin foam product 50 made of the molten foamable resin, the size of foam cells increases at the welds 55, thereby locally reducing the strength of the resin foam product 50. In particular, a relatively large load is exerted around the through holes 54 because the through holes 54 are provided for attachment and fixing of the resin foam product 50. Therefore, the through holes 54 and its vicinity have to maintain a required strength. The disclosed molding apparatus 1 and molding method are advantageous in avoiding the local reduction in strength of the resin foam product 50.

The molding apparatus 1 includes the molding die 4, and a resin feeder 7 for feeding the molten foamable resin 70 into the cavity 27 of the molding die 4 as shown in FIG. 1. The molding die 4 shown in this figure is simply depicted for easy understanding, and does not correspond to the shape of the resin foam product 50 shown in FIG. 2.

The molding die 4 includes a stationary die 21, and a movable die 22 capable of sliding in the horizontal direction (the left-right direction in FIG. 1) relative to the stationary die 21 to open and close the molding die 21. A recess 21*a* is formed in a surface of the stationary die 21 facing the movable die 22. Side surfaces forming the recess 21*a* correspond to cavity surfaces 27*b* forming the cavity 27. The movable die 22 is driven by a drive mechanism (not shown) to approach and separate from the stationary die 21. The movable die 22 is provided with a convex portion 22*a* protruding from a surface of the movable die 22 facing the stationary die 21 toward the stationary die 21 so as to fit into the recess 21*a*. The surfaces of the convex portion 22*a* correspond to the cavity surfaces 27*b* forming the cavity 27. Although not shown, the molding die 4 is provided with a cooling means for cooling the molten foamable resin 70 filled in the cavity 27. The cooling means may be constituted of, for example, a refrigerant flow path arranged in the molding die 4.

In closing the molding die 4, although not shown, the movable die 22 is moved toward the stationary die 21, and the convex portion 22*a* is fitted into the recess 21*a*, thereby closing the molding die 4. In this way, the recess 21*a* and the convex portion 22*a* form the cavity 27 in the molding die 4. As described later, in performing a core back process with the molding die 4, the movable die 22 is moved in the direction opposite the stationary die 21 with the convex portion 22*a* fitting in the recess 21*a*. In opening the molding die after the molding, the movable die 22 is greatly moved in the direction opposite the stationary die 21 until the convex portion 22*a* fitted in the recess 21*a* is detached from the recess 21*a*. Thus, the resin product molded in the cavity 27 can be removed from the molding die.

The resin feeder 7 includes an injection molding machine 5 for injecting the molten foamable resin 70, and a resin guiding path 6 arranged in the stationary die 21 to guide the molten foamable resin 70 injected from the injection molding machine 5 into the cavity 27.

The injection molding machine 5 includes a cylindrical injection cylinder 41. The injection cylinder 41 has a nozzle 41*a* at a front end thereof, and the nozzle 41*a* is connected to the resin guiding path 6. The injection molding machine 5 further includes a screw 42 arranged inside the injection cylinder 41 to be able to rotate and move back and forth in the injection cylinder 41. Although not shown, a drive mechanism for driving the screw 42 is provided at a rear end of the screw 42.

A hopper 43 for feeding resin pellets 71 is connected to an upper portion of the rear end of the injection cylinder 41. The resin pellets 71 are fed into the injection cylinder 41 through the hopper 43. The resin pellets 71 may be made of, for example, polypropylene, polyethylene, polystyrene, etc. Heaters (not shown) are arranged on an outer circumferential wall of the injection cylinder 41 to be aligned in the fore-and-aft direction of the injection cylinder 41. The resin pellets 71 fed in the injection cylinder 41 through the hopper 43 are heated by the heaters to melt as they are sent forward of the injection cylinder 41 by the rotation of the screw 42.

An injection nozzle 45 connected to a supercritical fluid feeder 46 is connected to a fore-and-aft center of the injection cylinder 41. The supercritical fluid feeder 46 feeds gas, such as nitrogen gas, carbon dioxide gas, etc., in the state of supercritical fluid (fluid exceeding a critical pressure and a critical temperature). The supercritical fluid feeder 46 injects the supercritical fluid in the injection cylinder 41 through the injection nozzle 45. In this way, the supercritical fluid is mixed and dissolved in a molten resin, which is the resin pellets 71 in the molten state, thereby preparing the molten foamable resin 70. In molding, the supercritical fluid is vaporized, thereby foaming the molten foamable resin 70. Specifically, in this embodiment, a physical foaming agent constituted of the supercritical fluid is used as a foaming agent so as to perform superfine foam molding by making use of the characteristics of the supercritical fluid, i.e., viscosity and solvency of the fluid, and vigorous molecular movement in the vapor state.

The screw 42 pushes the molten foamable resin 70 forward in the injection cylinder 41. Due to this pressure, the screw 42 moves backward, and the rotation of the screw 42 stops when the screw 42 moves backward by a predetermined distance. The predetermined distance is a distance with which the molten foamable resin 70 in an amount required for one injection is loaded in the space in the injection cylinder 41 forward of the screw 42. In this way, an amount of the molten foamable resin 70 to be fed into the cavity 27 of the molding die 4 is loaded in the space in the injection cylinder 41 forward of the screw 42. In injecting the molten foamable resin 70, the screw 42 is driven by the drive mechanism to move forward at high speed. Thus, the molten foamable resin 70 is fed into the cavity 27 of the molding die 4 through the nozzle 41*a* and the resin guiding path 6.

An upstream end (a right end in FIG. 1) of the resin guiding path 6 is opened in a surface of the stationary die 21 opposite the movable die 22, and communicates with the injection molding machine 5. The resin guiding path 6 is branched in two, and two openings are arranged in a side surface (a vertically extending cavity surface 27*b*) of the recess 21*a* in the stationary die 21 to be vertically spaced from each other. The openings in the cavity surface 27*b* of the recess 21*a* constitute the gates 27*a*. The molding die 4 has two vertically spaced gates 27*a* as shown in FIG. 1. Although not shown, the molten foamable resin 70 flows radially from each of the gates 27*a* to substantially fill the cavity 27. A downward flow of the molten foamable resin 70 from the upper gate 27*a*, and an upward flow of the molten foamable resin 70 from the lower gate 27*a* merge with (meet) each other at approximately halfway between the two gates 27*a*, and then weld to each other. The meeting and welding of the resin flows generate a weld in the finished resin foam product. In the following description, a portion of the molding die 4 corresponding to the weld generated in the resin foam product is referred to as a welding portion 23, and a portion adjacent to the welding portion 23 and upstream of the welding portion 23 in the flow direction of the molten foamable resin 70 may be referred to as an upstream portion 24.

Figure 3:
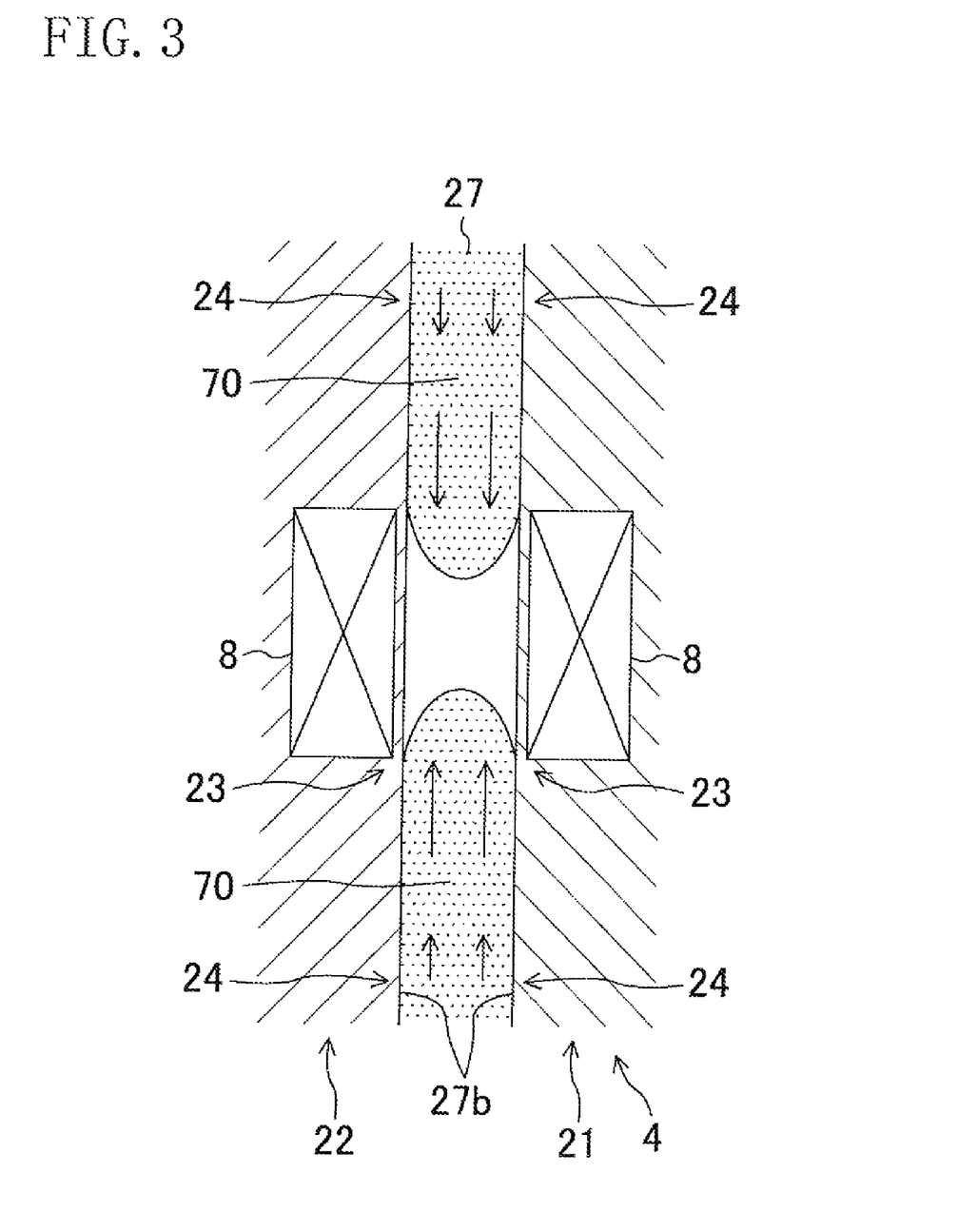
FIG. 3 is a cross-sectional view illustrating enlargement of a welding portion of an example molding die and its vicinity.

In this molding die 4, as shown in FIGS. 1 and 3, heaters 8 are arranged in the stationary die 21 and the movable die 22, respectively, near the welding portion 23. Each of the heaters 8 is connected to an electric heater control board 81, and is controlled by the control board 81. When energized, the heater 8 heats the cavity surfaces 27*b* near the welding portion 23. In the molding die 4 schematically depicted in FIG. 1, only one welding portion 23 is shown. However, if there are two or more welded portions 23 in the molding die 4, the heaters 8 may be arranged for the welded portions 23, respectively.

Figure 4:
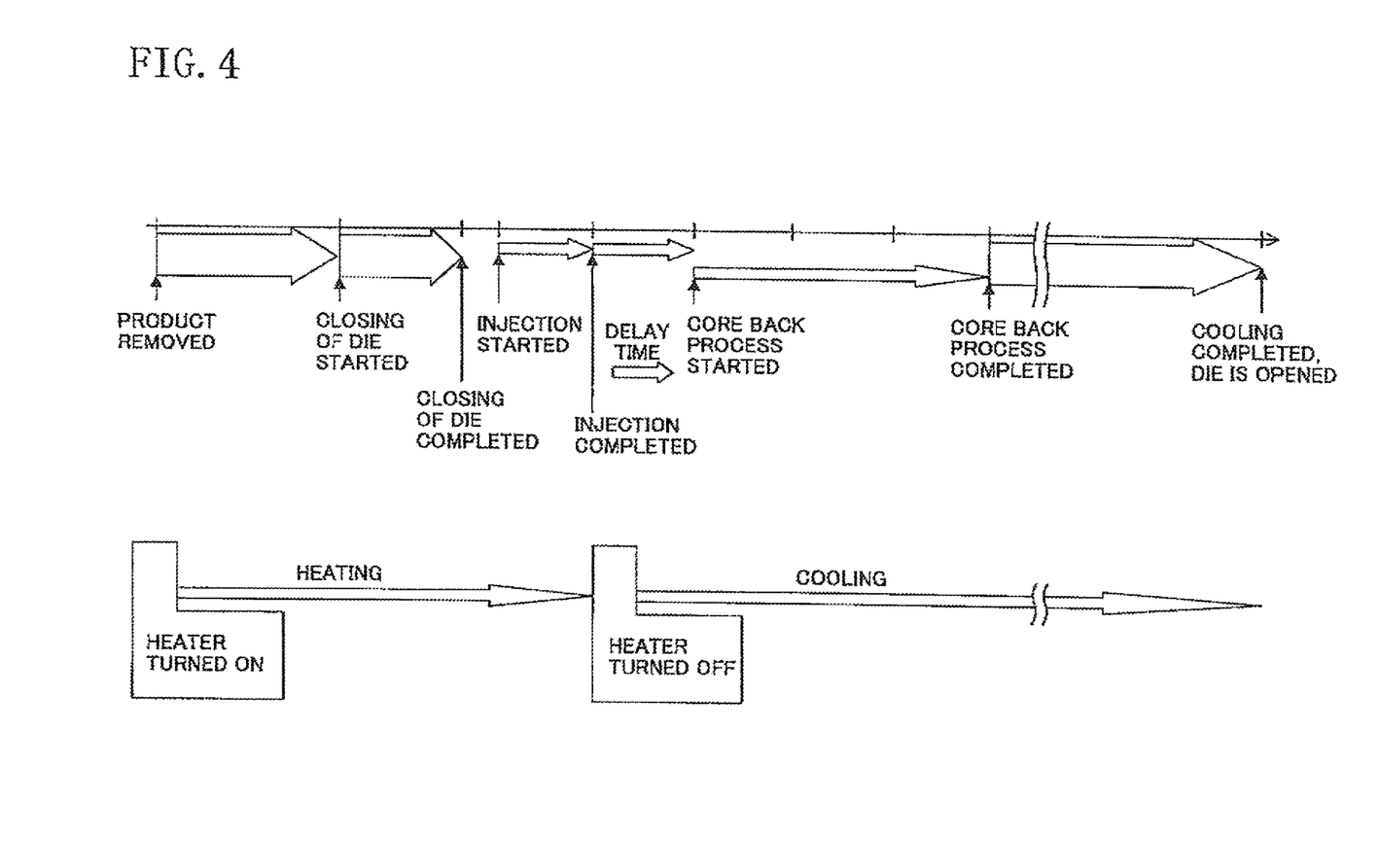
FIG. 4 is a timing chart illustrating an example of a process for molding a resin foam product.

Referring to FIG. 1 and a timing chart of FIG. 4, a method for molding the resin product using the molding apparatus 1 will be described. As shown in FIG. 4, the heaters 8 are turned on after a molded product obtained by a previous molding cycle is removed from the opened molding die 4. In this state, the movable die 22 is slid to start the closing of the molding die 4. Thus, the molding die 4 is closed as shown in FIG. 1.

After closing the molding die 4, the screw 42 of the injection molding machine 5 is moved forward at high speed with rotation, thereby injecting the molten foamable resin 70 contained in the space forward of the screw 42. The high pressure molten foamable resin 70 passes through the two gates 27*a*, and is fed into the cavity 27 of the molding die 4. The amount of the fed molten foamable resin 70 is smaller than the volume of the cavity 27. Specifically, a short shot of the molten foamable resin 70 is injected in the cavity 27. Injecting a short shot of the molten foamable resin 70 is advantageous in controlling the foaming ratio of the molded resin product.

The molten foamable resin 70 entered the cavity 27 flows in the cavity 27. The flow rate of the molten foamable resin 70 decreases as a distance traveled by the molten foamable resin 70 from the gate 27*a* increases due to a flow resistance resulting from the viscosity of the molten foamable resin 70, and solidification of the molten foamable resin 70 cooled by the cavity surfaces 27*b*. Therefore, the flow rate of the molten foamable resin 70 decreases at the welding portion 23 at a large distance from the gate 27*a*. The decrease in flow rate is a cause of the increase in size of foam cells at the weld.

In the above-described molding apparatus 1, the heaters 8 arranged near the welding portion 23 heat the cavity surfaces 27*b* around the welding portion 23 during the feeding of the molten foamable resin 70. The temperature of the heaters 8 may suitably be determined depending on the type of the resin used. The heating prevents the cooling of the molten foamable resin 70 by the cavity surfaces 27*b* around the welding portion 23, thereby suppressing the solidification of the molten foamable resin 70 due to the cooling by the cavity surfaces. At the same time, the molten foamable resin 70 is also heated, thereby decreasing the viscosity of the molten foamable resin 70. If the heater or other means is not used, the flow rate of the molten foamable resin 70 at the welding portion 23 is reduced lower than the flow rate at the upstream portion 24 due to the flow resistance. However, in this embodiment, the heating by the heaters 8 reduces the flow resistance, thereby suppressing the decrease in flow rate. Therefore, the flow rate of the molten foamable resin 70 at the welding portion 23 can be equal to or higher than the flow rate of the molten foamable resin 70 at the upstream portion 24 (see arrows in FIG. 3, the longer arrow means the higher flow rate). This allows the leading edges of the flows of the molten foamable resin 70 to meet each other in an early stage near the welding portion 23, thereby reducing a period of time where the foaming agent contained in the molten foamable resin 70 can foam in the leading edges of the flows before they meet, and suppressing the foaming of the foaming agent. At the same time, the pressure in the cavity near the welding portion increases, thereby suppressing the foaming of the foaming agent. In this way, the injection of the molten foamable resin 70 is completed. The heaters 8 continue heating until the injection is completed, and are turned off after the completion. Thus, the local heating by the heaters 8 is finished, and the molding die 4 is cooled by the cooling means.

After the injection of the short shot of the molten foamable resin 70 in the cavity 27 (after the injection is completed), and an elapse of a predetermined delay time, a core back process is started by moving the molding die 4 in the die opening direction. In the core back process, the movable die 22 is moved by a predetermined distance for a predetermined time. The travel distance of the movable die 22 is predetermined depending on the intended diameter of the foam cells. The core back process is advantageous in controlling foaming efficiency. Thus, the molten foamable resin 70 is foamed while increasing the volume of the cavity 27.

After starting the feeding of the molten foamable resin 70 into the cavity 27, the temperature of the molten foamable resin 70 gradually decreases. When the resin temperature reaches the solidifying temperature, the resin solidifies (cures). The temperature reaches the solidifying temperature after the core back process is completed. Solidification of the molten foamable resin 70 stops the foaming, and the diameter of the foam cells no longer increases.

After the completion of the core back process, the molten foamable resin 70 is left for a predetermined time to be completely solidified. In this way, the molding of the resin foam product using the molten foamable resin 70 is finished. Then, the movable die 22 is moved in the direction opposite the stationary die 21 to open the molding die 4, and the molded resin foam product is removed from the molding die 4. Unwanted parts are cut from the resin foam product, thereby finishing the resin foam product.

As described above, the molding apparatus 1 accelerates the flow of the molten foamable resin 70 using the heaters 8, thereby suppressing the decrease in flow rate of the molten foamable resin 70 at the welding portion 23. This can suppress the increase in foam cell size at the weld of the resin foam product, thereby avoiding local reduction in strength of the resin foam product.

In particular, when a short shot of the molten foamable resin 70 is injected into the cavity 27, the foam cell size at the weld is likely to increase. Further, the core back process performed during the molding easily causes the increase in foam cell size at the weld. However, as described above, the molding apparatus 1 can suppress the increase in foam cell size even if the short shot process and the core back process are performed. This is particularly advantageous for easy control of the foaming ratio by the short shot process and/or the core back process. The injection of the short shot of the molten foamable resin 70 and the core back process are not essential, and can be omitted as required.

Figure 5:
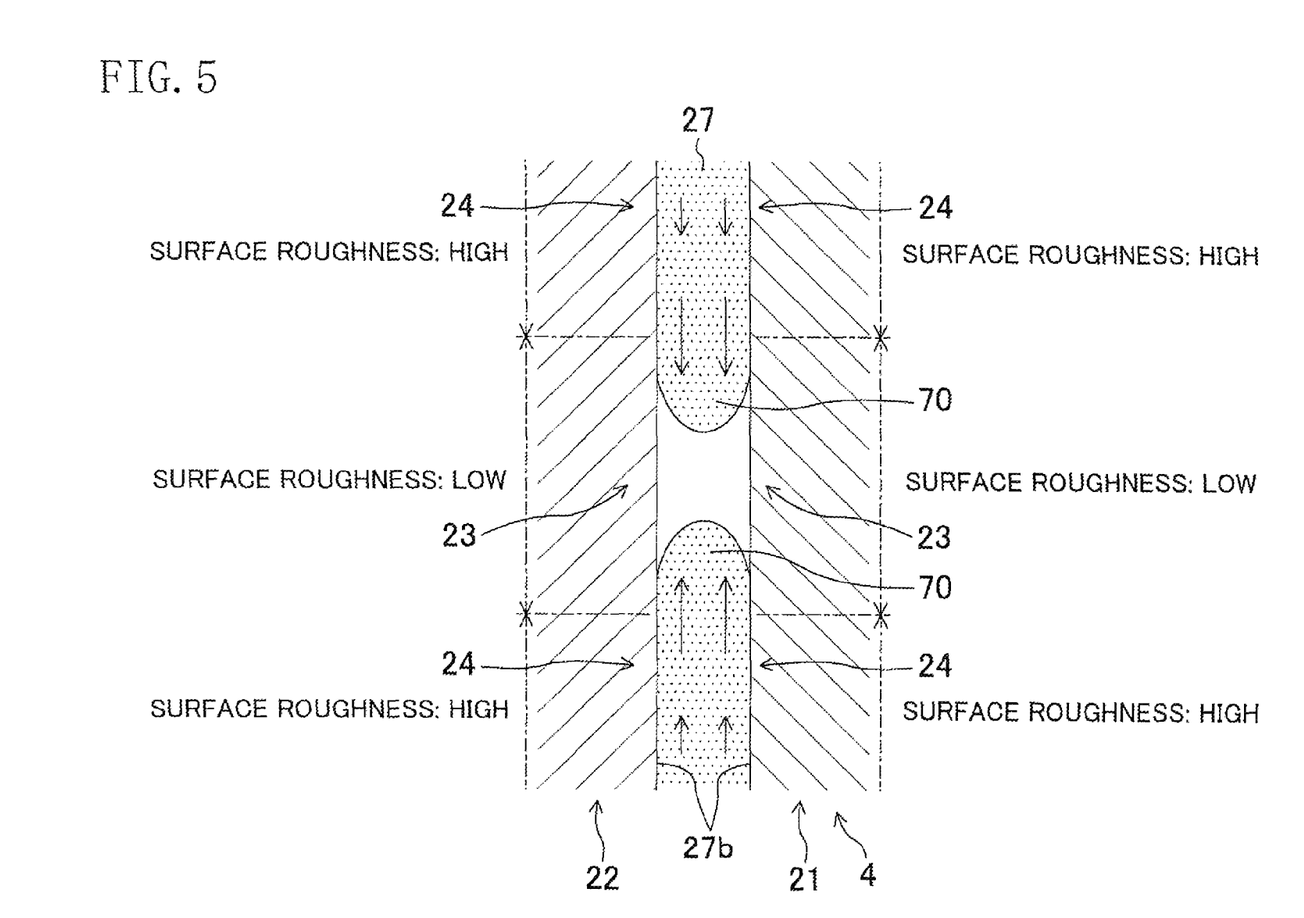
FIG. 5 is a cross-sectional view illustrating enlargement of a welding portion of the example molding die and its vicinity different from that shown in FIG. 3.

A configuration different from the above-described one will be described with reference to FIG. 5. This configuration can also suppress the increase in foam cell size at the weld. Specifically, in the example configuration shown in FIG. 5, the heaters 8 are not arranged near the welding portion 23 of the molding die 4. Instead, the cavity surfaces 27b are modified to reduce the flow resistance of the molten foamable resin 70.

In the molding die 4, although not shown in detail, the cavity surfaces 27b corresponding to the welding portion 23 and the cavity surfaces 27b corresponding to the upstream portion 24 are finished in different ways in such a manner that the former cavity surfaces 27b have a relatively low surface roughness, and the latter cavity surfaces 27b corresponding to the other portion including the upstream portion 24 have a relatively high surface roughness. The cavity surfaces 27b corresponding to the welding portion 23 may be minor-finished, for example. The cavity surfaces 27b corresponding to the welding portion 23 may have, for example, arithmetic average roughness Ra of 0.1 μm or lower. The cavity surfaces 27b corresponding to the other portion including the upstream portion 24 may have, for example, arithmetic average roughness Ra of 1.0 to 5.0 μm. Smoothening the cavity surfaces 27b corresponding to the welding portion 23 reduces the flow resistance due to the contact between the molten foamable resin 70 and the cavity surfaces 27b, thereby suppressing the decrease in flow rate of the molten foamable resin 70. As a result, the flow rate of the molten foamable resin 70 at the welding portion 23 becomes equal to or higher than the flow rate of the molten foamable resin 70 at the upstream portion 24, thereby preventing the increase in foam cell size at the weld in the same manner as the above-described configuration.

Instead of the surface finishing of the cavity surfaces 27b, a coating may be provided on the cavity surfaces 27b for smoothening the surfaces. For example, a coating that offers high smoothness, such as diamond-like carbon (DLC), may be arranged on the cavity surfaces 27b corresponding to the welding portion 23. A member having a smooth surface, e.g., a glass plate, may be bonded to the welding portion 23 so as to smoothening the cavity surfaces 27b.

Figure 6:
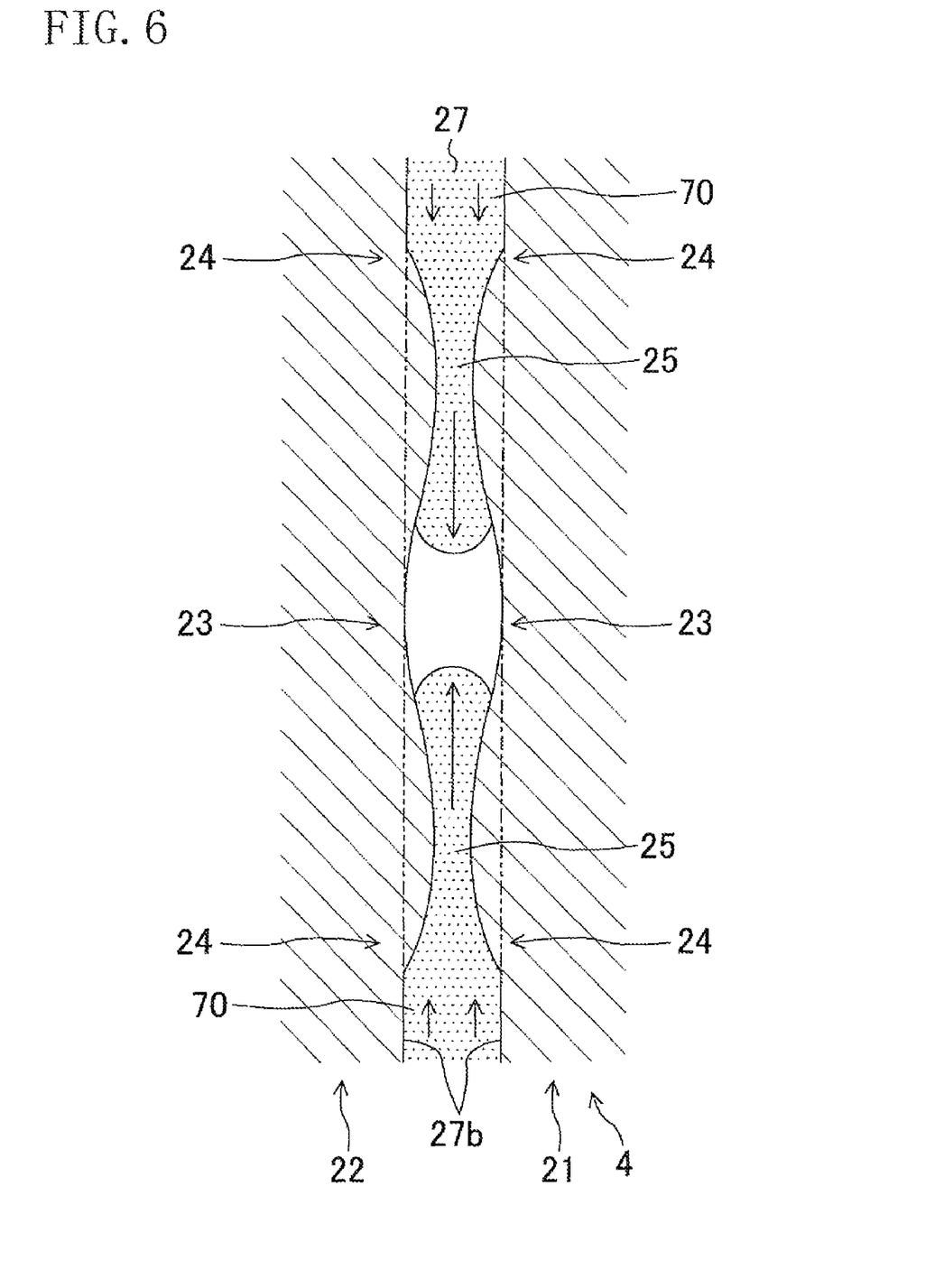
FIG. 6 is a cross-sectional view illustrating enlargement of a welding portion of the example molding die and its vicinity different from those shown in FIGS. 3 and 5.

In the above description, the decrease in flow rate of the molten foamable resin 70 at the welding portion 23 is suppressed by reducing the flow resistance of the molten foamable resin 70. However, for suppressing the increase in foam cell size, a configuration capable of accelerating the flow rate of the molten foamable resin 70 at the welding portion 23 may be employed. FIG. 6 shows an example of such configuration. Specifically, a restriction 25 where a cross-sectional area of a flow path of the molten foamable resin 70 is reduced is formed in the molding die 4 in a position closer to the welding portion 23 than to the upstream portion 24. As shown in FIG. 6, the restriction 25 may be formed in part of the molding die 4 in the flow direction of the molten foamable resin 70. Although not shown, the restriction 25 may be arranged in the molding die 4 with a certain length in the flow direction to extend to the welding portion 23. The restriction 25 is formed by bulging the cavity surfaces 27b of the stationary die 21 and the movable die 22. When the molten foamable resin 70 flowing in the cavity 27 passes through the restriction 25, the flow rate thereof increases, thereby making the flow rate of the molten foamable resin 70 at the welding portion 23 equal to or higher than the molten foamable resin 70 at the upstream portion 24. This can suppress the increase in foam cell size at the weld of the resin foam product in the same manner as the above-described configuration.

According to the configuration including the restriction 25, part of the resin foam product corresponding to the restriction 25 may be thinned down. From this point of view, the size of the restriction 25 is preferably adjusted so as not to reduce the strength of the resin foam product. After the molten foamable resin 70 is filled in the cavity 27, the core back process may be performed to increase the gap between the cavity surfaces 27b corresponding to the restriction 25, thereby ensuring a required thickness of the resin foam product.

The disclosed techniques are not limited to the molding using the physical foaming agent, but can be applied to the molding using chemical foaming agents.

The disclosed techniques are not limited to the molding of the resin foam product, and can be applied to the molding of solid (non-foam) resin products including the weld. Also in this case, the disclosed techniques can suppress the generation of weld in the molded resin products. However, as described above, the molding using the molten foamable resin is accompanied by the specific drawbacks, such as the increase in foam cell size at the weld, and the resulting local reduction in strength of the resin foam product. The molding apparatus 1 and the molding method described above can be a solution to the drawbacks, and are particularly advantageous in the molding of the resin foam product.

What is claimed is:

1. A method for molding a resin foam product comprising:
    feeding a molten foamable resin by injection in a cavity formed by cavity surfaces of a molding die;
    allowing the molten foamable resin fed in the cavity to flow in the cavity so as to substantially fill the cavity; and
    foaming and solidifying the molten foamable resin substantially filling the cavity to mold the resin foam product, wherein
    the molding die has a welding portion corresponding to a weld generated in the resin foam product where a plurality of flows of the molten foamable resin meet and weld to each other, and an upstream portion, which includes a first upstream portion and a second upstream portion, adjacent to the welding portion and upstream of the welding portion in a flow direction of the molten foamable resin, and
    flow rate control is performed in such a manner that a flow rate of the molten foamable resin at the welding portion is equal to or higher than a flow rate of the molten foamable resin at the upstream portion,
    the molding die includes at least two restrictions where a cross-sectional area of a flow path of the molten foamable resin is reduced in a position between the welding portion, which is located at approximately a center of the cavity and between the first and the second upstream portions.

2. The method of claim 1, wherein
the flow rate control is performed by reducing a flow resistance of the molten foamable resin at the welding portion lower than a flow resistance of the molten foamable resin at the upstream portion.

3. The method of claim 2, wherein
the flow rate control is performed by raising a temperature of the cavity surfaces corresponding to the welding portion higher than a temperature of the cavity surfaces corresponding to the upstream portion.

4. The method of claim 2, wherein
the flow rate control is performed by making the cavity surfaces corresponding to the welding portion smoother than the cavity surfaces corresponding to the upstream portion.

5. The method of claim 1, wherein
the molding includes moving the molding die in a die opening direction to increase a volume of the cavity, thereby foaming the molten foamable resin in the cavity.

6. The method of claim 1, wherein
the feeding is performed by feeding the molten foamable resin into the cavity in an amount smaller than the volume of the cavity.

7. An apparatus for molding a resin foam product comprising:
a molding die having a cavity formed by cavity surfaces; and
a feeder for feeding a molten foamable resin in the cavity by injection, wherein
the molten foamable resin fed in the cavity by the feeder flows in the cavity to substantially fill the cavity,
the molding die has a welding portion corresponding to a weld generated in the resin foam product where a plurality of flows of the molten foamable resin meet and weld to each other, and an upstream portion, which includes a first upstream portion and a second upstream portion, adjacent to the welding portion and upstream of the welding portion in a flow direction of the molten foamable resin,
the molding die is configured to control a flow rate of the molten foamable resin at the welding portion to be equal to or higher than a flow rate of the molten foamable resin at the upstream portion, and
the molding die includes at least two restrictions where a cross-sectional area of a flow path of the molten foamable resin is reduced in a position between the welding portion, which is located at approximately a center of the cavity and between the first and the second upstream portions.

8. The apparatus of claim 7, wherein
the molding die is configured to move the molding die in a die opening direction to increase a volume of the cavity, thereby foaming the molten foamable resin in the cavity.

* * * * *